United States Patent [19]

Shinriki

[11] 4,277,183
[45] Jul. 7, 1981

[54] MIXING MACHINE

[75] Inventor: Tatsuo Shinriki, Chiba, Japan

[73] Assignee: Height Inc., Chiba, Japan

[21] Appl. No.: 40,392

[22] Filed: May 18, 1979

[30] Foreign Application Priority Data

May 31, 1978 [JP] Japan ................................ 53/65491

[51] Int. Cl.³ ........................... B01F 7/24; A21C 1/02
[52] U.S. Cl. ..................................... 366/98; 366/139;
366/149; 366/310; 366/320
[58] Field of Search ..................... 366/98, 97, 69, 148,
366/149, 312, 310, 302, 320, 139

[56] References Cited
U.S. PATENT DOCUMENTS

| 3,155,376 | 11/1964 | Mollenbruck | 366/98 |
| 3,250,519 | 5/1966 | Herfeld | 366/314 |
| 3,333,827 | 8/1967 | Lodige | 366/97 |
| 3,877,881 | 4/1975 | Ono | 366/149 |
| 3,914,956 | 10/1975 | Knight | 366/149 |

Primary Examiner—Robert W. Jenkins
Attorney, Agent, or Firm—Norris & Bateman

[57] ABSTRACT

A mixing machine is provided with a temperature regulating jacket surrounding the outer circumferential surface of a mixing tub, and with mixing vane members each composed of an upper portion being fixed to a vertical shaft, a lower portion being fixed to a vertical blade member, a center plate member to which are fixed the shaft and the lower end of the blade member and scraping vane members fixed to the outer circumferential portion of the center plate member. The mixing machine generates a large pulling and cutting force to produce a bread dough and the like in an extremely short period of time while the machine prevents degradation in the quality of dough due to the mechanically generated heat during the mixing operation by using the temperature regulating jacket for the mixing tub.

8 Claims, 11 Drawing Figures

MIXING MACHINE

This invention relates to a mixing machine particularly suited for mixing and kneading the raw ingredients for bread dough, pastry dough, cake dough and the like.

A mixing machine is adapted to mix and knead a material which exhibits a comparatively high consistency by means of subjecting the material to a large stretching and contracting force, namely the combined actions of folding back, pulling and shearing being applied simultaneously. The conventional mixing machine, however, can not apply a pulling and contracting force of sufficient magnitude. However, intensifying this force necessitates more complicated mixing vanes as well as the mechanism for mounting them, and the possibility of breakage which accompanies this more complicated structure can not easily be avoided. As a result, mixing and kneading conducted for a short period of time gives rise to uneven mixing, a factor which tends to provide products of nonuniform quality owing to irregularities in air bubble diameter and air bubble distribution that are likely to occur in bread dough, by way of example. Conducting mixing for a long period of time gives mechanical energy to the dough (mixture) and causes the generation of heat and an accompanying rise in the dough temperature. This frequently spoils product quality and leads to over-mixing (excessive softening or break down) since the dough is very sensitive to temperature in mixing. The nonuniformity of the mixed dough and the degradation in its quality resulted in a need for additional special equipments and a loss of time and raw materials, to correct its faults or reject it in following processing. Furthermore, another problem was that there was no guarantee of consistent high quality in the final products.

On the other hand, in the bread-making industry, for example, sponge dough fermentation over a period of several hours is required to avoid over-mixing during the mixing operation and to allow air bubbles to disperse evenly throughout the dough. In addition, even if a short period of time is sufficient for the mixing operation itself, production of a good-tasting product can not be accomplished without keeping even dough quality by foregoing sponge fermentation process as above, and without reduction in the yield of the dough per mixing cycle.

The present invention seeks to provide a mixing machine which overcomes the abovementioned difficulties encountered in the prior art mixing machines and makes it possible to mix in a very short period of time dough exhibiting a high degree of homogenity by generating a more powerful and precise stretching and shearing force than has heretofore been available. In addition to the precise, powerful stretching and shearing action, the dough being treated is subjected to an enhanced heat transfer and temperature regulating effect to ensure that the dough quality will be maintained during the course of mixing. The mixing machine in accordance with the present invention operates at high speed despite its small size and therefore makes it possible to carry out mixing and kneading with high efficiency in a small space.

In order to realize the abovementioned advantages the present invention adopts a unique design and provides a mixing machine comprising a mixing tub; mixing vane members each composed of an upper portion being a leading end, the upper portion being fixed to a vertical rotary shaft and pointed in the forward direction of rotation, and a lower portion being a trailing end, the lower portion being fixed to a vertical blade member which is pointed substantially in the direction of rotation; a center plate member to which are fixed the vertical rotary shaft and the lower end of the vertical blade member; and a plurality of scraping vanes in spaced-apart relationship fixed to the outer circumferential portion of the center plate member. The mixing machine can be provided with a plurality of spaced-apart deflecting members fixed to the inner circumferential surface of the mixing tub. It is also possible to surround the outer circumferential surface of the mixing tub by a temperature regulating jacket to control the dough temperature in operation. The temperature regulating jacket is provided with a plurality of baffle plates located between the inner and outer shells that define the mixing tub, allowing a temperature regulating fluid to be circulated within the jacket to uniformly transfer heat to or absorb heat from the dough in the tub. In this case the outer surface of the temperature regulating jacket can be enclosed within a heat insulator. The efficient heat transfer relationship between the jacket and the dough being treated can be facilitated further by allowing the temperature regulating fluid which is circulating within the jacket to flow through a cavity located in the deflecting members. It is also possible to install means for evacuating the mixing tub if the dough being treated so requires. Furthermore if the dough is of the type which undergoes a change in consistency during mixing and kneading, the speed of rotation of a rotary portion, particularly the mixing vane members and vertical blade member, can be varied relative to the scraping vanes, or the speed of rotation of the entire rotary portion itself can be varied, thereby allowing the mixing speed to be changed at will.

The mixing machine according to the present invention adopts torque as the mechanical energy source and efficiently converts this energy to mixing and kneading action to establish the optimum mixing and kneading conditions while adjusting the temperature, with the mixing tub in an evacuated state when necessary.

The structure, actions and effects of the present invention will become more apparent from the following detailed description of a preferred embodiment thereof.

Figure 1:
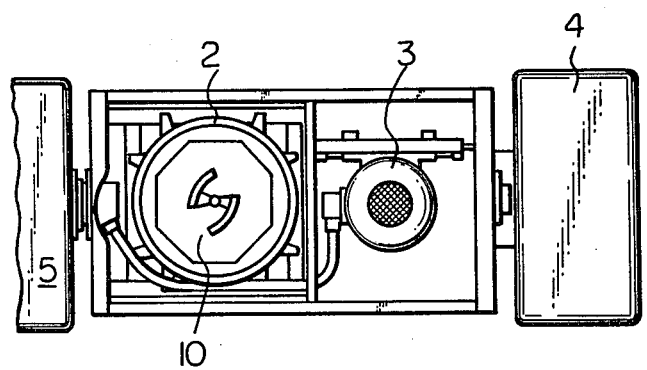
FIG. 1 is a plan view of a mixing machine in accordance with the present invention.
Figure 2:
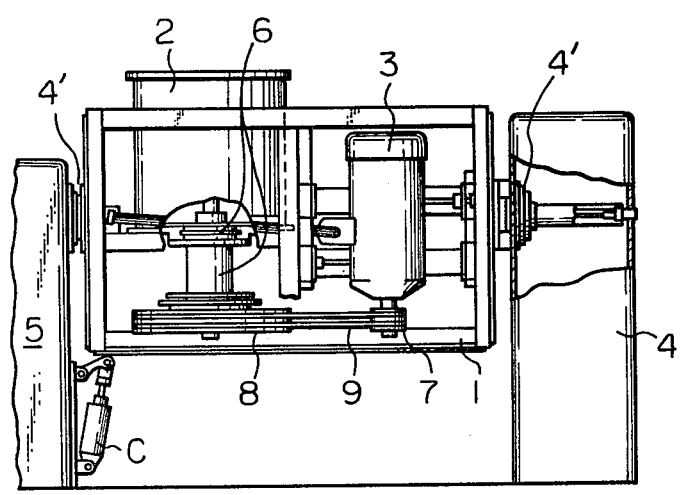
FIG. 2 is a front view of the mixing machine shown in FIG. 1 with a portion broken away.

Referring now to FIGS. 1 and 2 which show the overall arrangement of a mixing machine according to the present invention, a mixing tub 2 is fixedly supported by a machine frame or frame 1 supported on bearing stands 4, 5 through bearings 4' located on either side of the frame. Power for driving a rotary portion 10 located within mixing tub 2 is provided by a motor 3 through a wheel 8 and belt 9 stretched between the motor and the wheel. The rotary portion 10 is supported by a bearing assembly 6 directly below the center of the tub 2. The structure is further adapted so that a pressure cylinder C is actuated to tilt the entire frame 1 or the tub 2 alone when the dough is discharged from the tub upon completion of the mixing and kneading.

Figure 3:
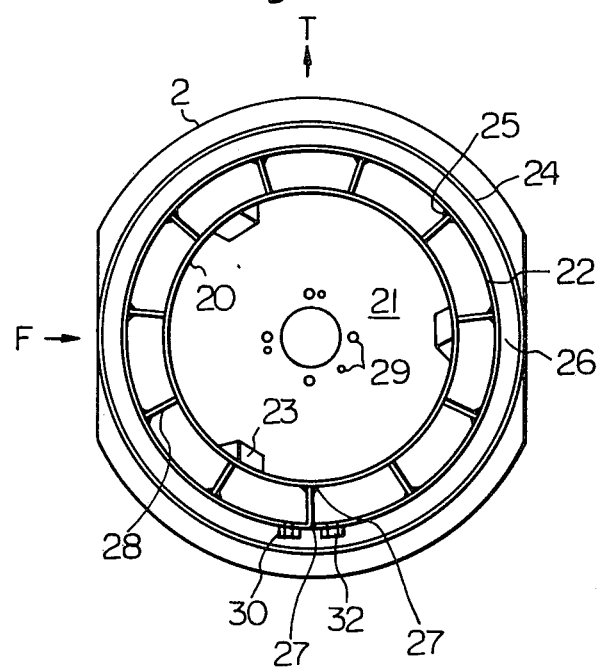
FIG. 3 is a cross-sectional view, taken along the line A—A of FIG. 4, of a mixing tub which is a portion of the mixing machine according to the present invention.
Figure 4:
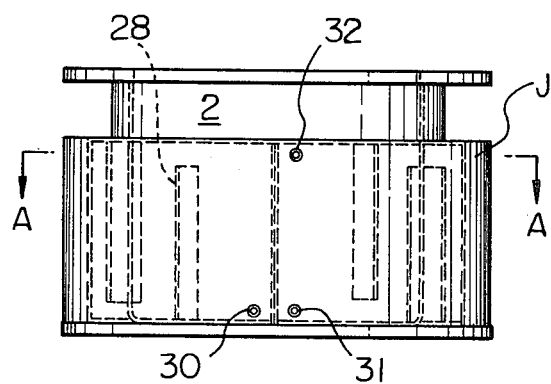
FIG. 4 is a side view of the mixing tub shown in FIG. 3.

FIGS. 3 and 4 illustrate mixing tub 2 in detail. If T is taken as the direction of the axis of tilt when the tub 2 is tilted, F will designate the front of the tub. The tub which has a bowl-shaped configuration comprises an inner shell or inner wall 20 and a bottom wall or bottom portion 21, and is surrounded by a jacket 22 enclosed within a heat insulating cylindrical mantle 24 accommodating a heat insulator 26. Baffle plates 28 extending axially of tub 2 are welded to the jacket 22 between inner shell 20 and an outer shell 25. If a temperature regulating fluid for cooling or heating is introduced from a fluid inlet 30, the arrangement is such that the fluid will initially rise within the jacket and proceed from a gap at the upper portion of the jacket to a neighboring compartment in which the fluid will descend, thereby allowing the fluid to uniformly flow up and down in regular succession within the jacket before finally being discharged from a fluid outlet 32. Designated at 31 is a drain port for attaching a drain cock. In accordance with this construction only the baffle plate between the inlet 30 and outlet 31 is welded along both its side edges 27 and upper and lower ends so as to form a fluid-tight seal between the inlet 30 and outlet 31.

Deflecting member 23 which as shown in FIG. 3 is on the inner wall of the temperature regulating jacket is provided with a cavity that is in fluid communication with the interior of the temperature regulating jacket (by means not shown) so that temperature regulating fluid which circulates within the jacket may pass through the cavity.

FIGS. 5 through 9 depict a more detailed view of the rotary portion 10 of a mixing machine in accordance with the present invention.

Figure 5:
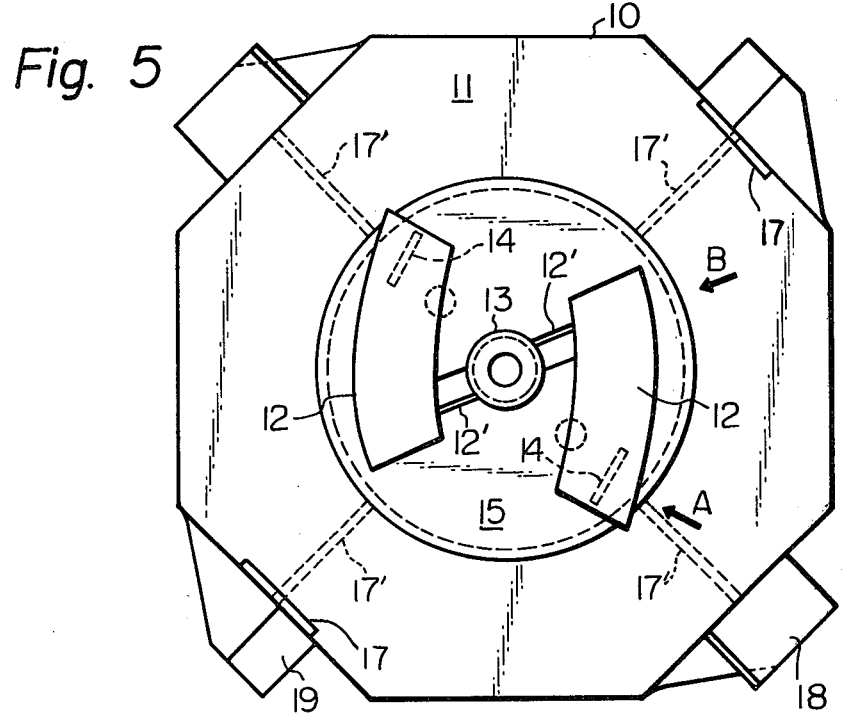
FIG. 5 is a top view of a rotary portion according to the present invention.

FIG. 5 is a top view of rotary portion 10 mounted at the bottom portion of mixing tub 2. As illustrated in the drawing, a center disk 15 having a vertical shaft 13 erected at its center is secured to an approximately octagonally shaped rotary plate 11. Projecting outward from the upper part of vertical shaft 13 and approximately perpendicular thereto is as arm 12' to which is fixed the upper portion of a mixing vane 12. The lower portion of mixing vane 12 is fixed to a vertical blade member 14 erected on the center disk 15. There may be provided a plurality of reinforcing ribs 17' on the lower face of rotary plate 11, if necessary.

Figure 6:
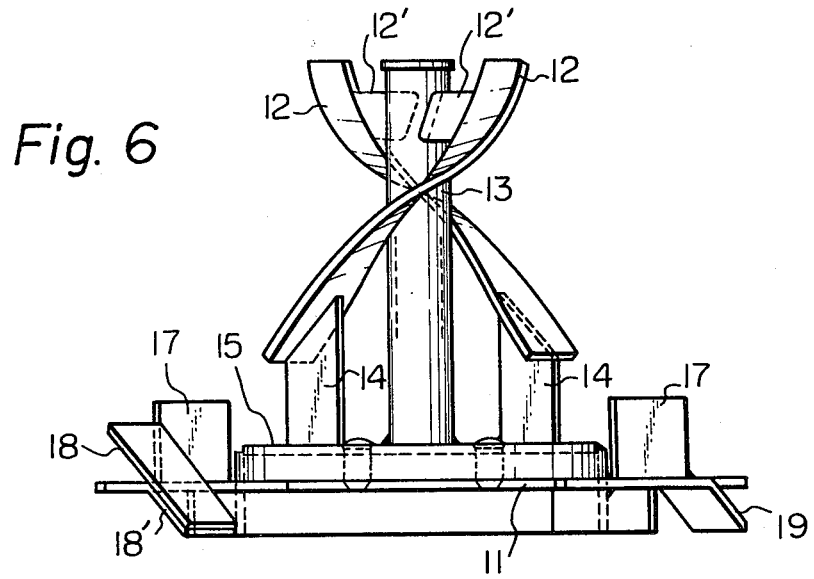
FIGS. 6 and 7 are side views of the rotary portion shown in FIG. 5.
Figure 7:
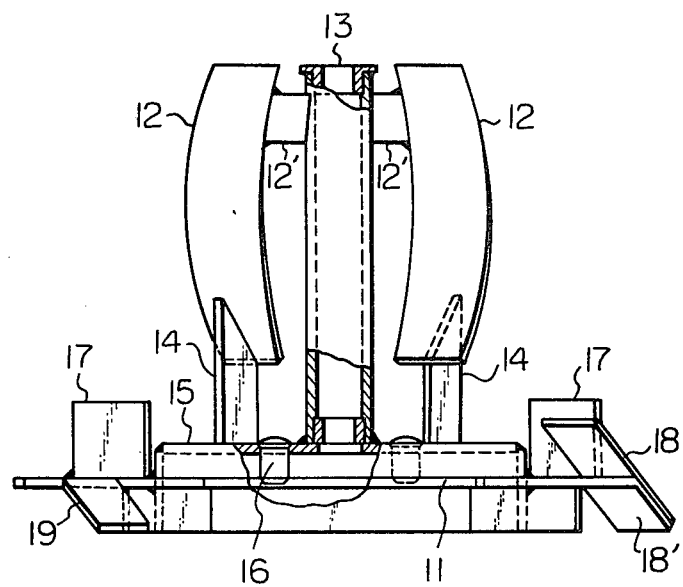
Figure 8:
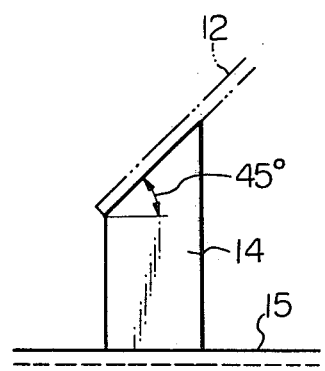
FIG. 8 is a front view of a vertical blade member as viewed along the direction A of FIG. 5.
Figure 9:
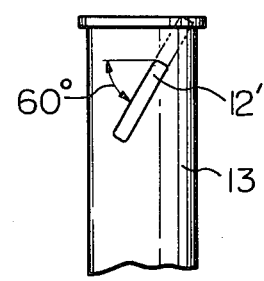
FIG. 9 is a side view of the upper portion of a vertical shaft 13 as viewed along the direction B of FIG. 5.

As can be more clearly seen in FIGS. 6 and 7, mixing vane 12 at its upper portion points in the forward direction of rotation and has a wing-shaped configuration, the vane also including a curved portion which points downward. Arranged about the outer circumferential portion of rotary plate 11 and spaced apart from each other by angles of substantially equal magnitude are a plurality of scraping vanes composed of a circumferencially directed vertically extending small square plate or vane member 17, a small rectangular scraping vane member 18 fixed to a mounting plate 18' formed by bending down the edge portion of rotary plate 11, and a scraping vane member 19 obtained by leaving mounting plate 18' uncovered. The angle defined by the upper end of vertical blade 14 and the plane of mixing vane 12 is preferably about 45 degrees as shown in FIG. 8, while the angle defined by arm 12' and a line perpendicular to the axis of vertical shaft 13 is preferably on the order of 60 degrees as shown in FIG. 9. However, the magnitudes of these angles are not particularly limited and in no way restrict the scope of the invention.

In accordance with this construction, mixture placed in mixing tub 2 is first pressed downward by the surface of kneading vane 12 upon rotatably driving rotary portion 10, which is mounted at the bottom of tub 2, in the direction of the arrow as shown in FIG. 5. Since vertical blade member 14 is erected on the bottom surface of vane 12 at the lower portion thereof and points substantially in the direction of rotation, the dough which has been pressed down below the vane 12 is sectioned and then divided (cut and folded) on either side of the vertical blade member 14. In this way the portion of the highly viscous dough that has been thrust radially outward from the rotary portion 10 is pulled and folded by the vertical vane member 17. Meanwhile the portion of the dough located closer to the center of the tub is gradually thrust radially outward while colliding with and piling on the portion pulled and folded as described above. The dough as it approaches the outer periphery of the rotary portion is scraped up and down by the scraping vane members 18, 19 while being pressed between deflecting members 23 on the tub inner wall. However, just as the dough is being lifted it is once again pressed down and turned under by mixing vane 12, after which vertical blade 14 again sections the dough, so that the pulling, folding, colliding, piling, scraping operations are repeated. Since the dough is thus repetitively subjected to stretching and cutting actions resulting from a combination of powerful movements, the mixing, stirring and kneading operations are rapidly and uniformly carried out, thereby allowing complete mixing and kneading of the dough in an extremely short period of time.

Figure 10:
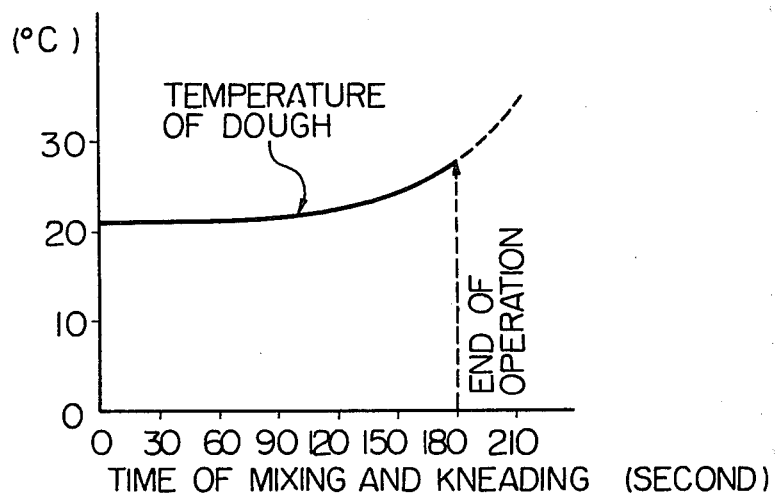
FIGS. 10 and 11 are characteristic curves for a case in which the mixing machine of the present invention is utilized to mix bread dough.

When the mixing machine in accordance with the present invention described above is utilized to mix bread dough the impregnation of water into the ingredients is facilitated preferably by evacuating the mixing tub and then subjecting the ingredients such as wheat flour and water to the mixing and mixing actions under deaerated conditions. The dough in the tub under such deaeration reaches the gluten development stage very rapidly, but the dough temperature highly rises in proportion to the mixing time and the cooling action for the dough temperature regulation soon attains the limit of its effectiveness. This can be understood from FIG. 10. If the dough temperature rises excessively it is necessary to terminate the mixing operation before the limit of cooling effect is reached since an excessive rise in the dough temperature will result in overmixing and cause the dough to soften excessively or to become soggy.

Figure 11:
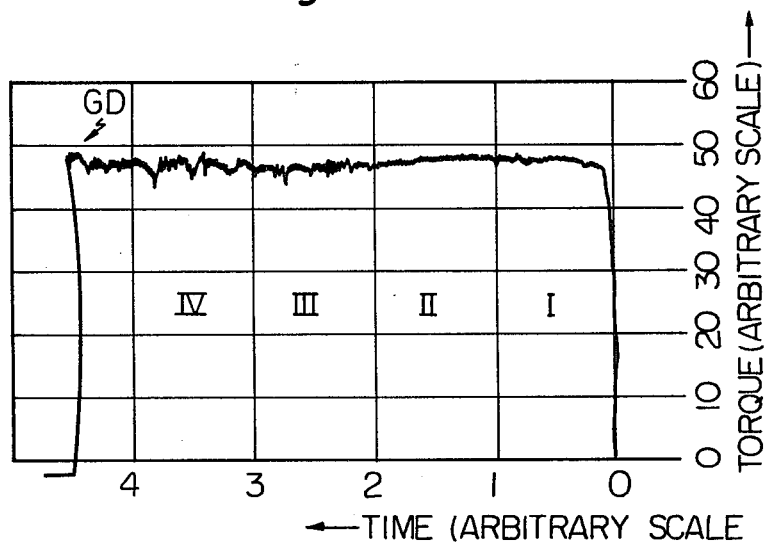

Referring to FIG. 11 in the dough consistency meter, if the reacting torque applied to the rotary portion from the beginning of mixing is detected, the dough attains substantially maximum consistency in the mixing stage I. After the dough has passed through the gluten formation stage II, the S—S bond decomposition stage or reduction stage III and the oxidative effect stage IV, the torque shows a slight increase at the point GD which represents the high development of gluten mixing is therefore terminated at this time. The mixing time required to attain this point is a brief 3 minutes.

In the case of bread dough it is thus possible to perfect a dough which has attained a highly developed glutenous state in an extremely short period of time. The air bubbles entrapped within the dough are dispersed and distributed finely and uniformly, and the dough exhibits excellent mechanical tolerance, namely resisting characteristics against breakage of the gluten network. Since bread dough of this excellent quality can be produced, there is absolutely no need to allow the dough to develop for more than 4 hours for sponge dough fermentation as was the case in the past.

The apparatus in accordance with the present invention as described above results in a variety of advantages and satisfies the requirements not only of the bread-making industry but of many related fields as well.

I claim:

1. A mixing machine characterized by the provision of a mixing tub; a temperature regulating jacket surrounding the outer circumferential surface of said mixing tub; mixing vane members each composed of an upper portion being a leading end, the upper portion being fixed to a vertical rotary shaft and pointed in the forward direction of rotation, and a lower portion being a trailing end, the lower portion being fixed to a vertical blade member which is pointed substantially in the direction of rotation; a center plate member to which are fixed the vertical rotary shaft and the lower end of the vertical blade member; and a plurality of scraping vane members in spaced-apart relationship fixed to the outer circumferential portion of said center plate member.

2. A mixing machine characterized by the provision of a mixing tub; a temperature regulating jacket surrounding the outer circumferential surface of said mixing tub; a plurality of deflecting members spaced apart and fixed to the inner circumferential surface of said mixing tub; mixing vane members each composed of an upper portion being a leading end, the upper portion being fixed to a vertical rotary shaft and pointed in the forward direction of rotation, and a lower portion being a trailing end, the lower portion being fixed to a vertical blade member which is pointed substantially in the direction or rotation; a center plate member to which are fixed the vertical rotary shaft and the lower end of the vertical blade member; and a plurality of scraping vane members in spaced-apart relationship fixed to the outer circumferential portion of said center plate member.

3. A mixing machine characterized by the provision of a mixing tub; a temperature regulating jacket surrounding the outer circumferential surface of said mixing tub; at least one helical mixing vane member; a vertical rotary shaft and a center plate member fixed to said vertical rotary shaft, said helical mixing vane being fixed to said rotary shaft and to said center plate member and at least one scraping vane member fixed to the outer circumferential portion of said center plate member, said temperature regulating jacket including an inner shell, an outer shell surrounding but spaced from said inner shell, and a plurality of baffle plates provided in an approximately equally spaced-apart relationship between said inner shell and said outer shell.

4. A mixing machine according to claim 3, wherein the outer surface of said temperature regulating jacket is surrounded by a heat insulator.

5. A mixing machine according to claim 3, characterized further by the provision of means for evacuating the interior of said mixing tub.

6. A mixing machine according to claim 3, characterized further by the provision of means for varying the mixing speed.

7. A mixing machiner characterized by the provision of a mixing tub; a temperature regulating jacket surrounding the outer circumferential surface of said mixing tub; at least one deflecting member fixed to the inner circumferential surface of said mixing tub; at least one helical mixing vane member; a vertical rotary shaft; a center plate fixed to said vertical rotary shaft, said helical mixing vane member being fixed to said vertical rotary shaft and to said center plate member, and at least one scraping vane member fixed to the outer circumferential portion of said center plate member, said temperature regulating jacket including a plurality of baffle plates provided in an approximately equally spaced-apart relationship between the inner shell and outer shell of said mixing tub.

8. A mixing machine characterized by the provision of a mixing tub; a temperature regulating jacket surrounding the outer circumferential surface of said mixing tub; at least one deflecting member fixed to the inner circumferential surface of said mixing tub; at least one helical mixing vane member; a vertical rotary shaft; a center plate fixed to said vertical rotary shaft, said helical mixing vane member being fixed to said vertical rotary shaft and to said center plate member, and at least one scraping vane member fixed to the outer circumferential portion of said center plate member, said deflecting member being provided with a cavity through which passes a temperature regulating fluid that circulates within said temperature regulating jacket.

* * * * *